Aug. 27, 1963   G. LONG ETAL   3,101,853
ROTARY VALVE
Filed Jan. 11, 1961
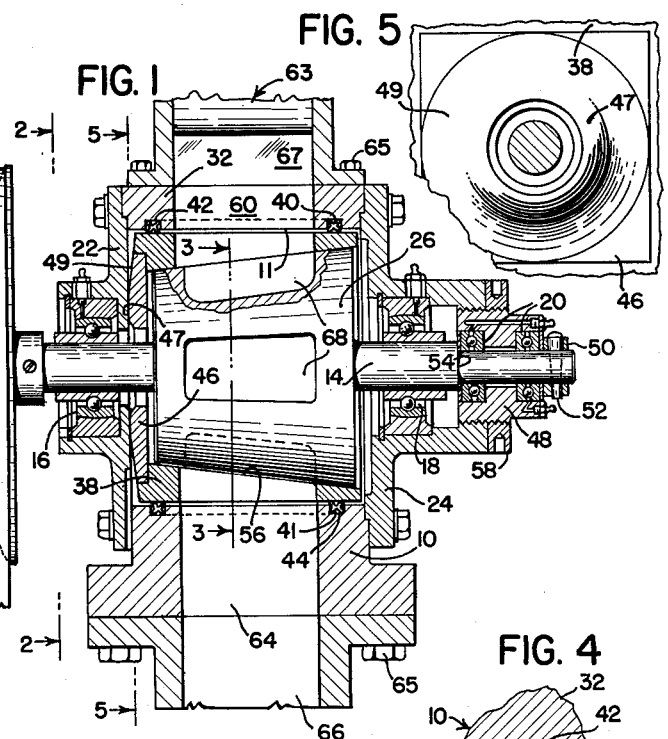
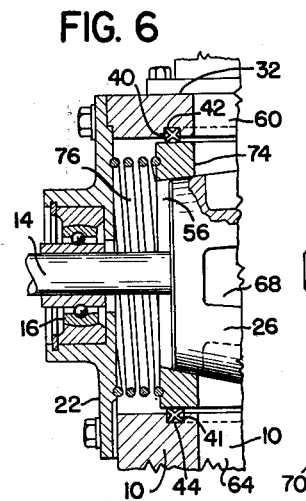
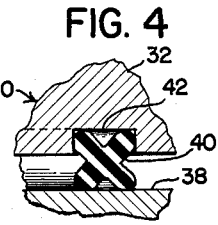
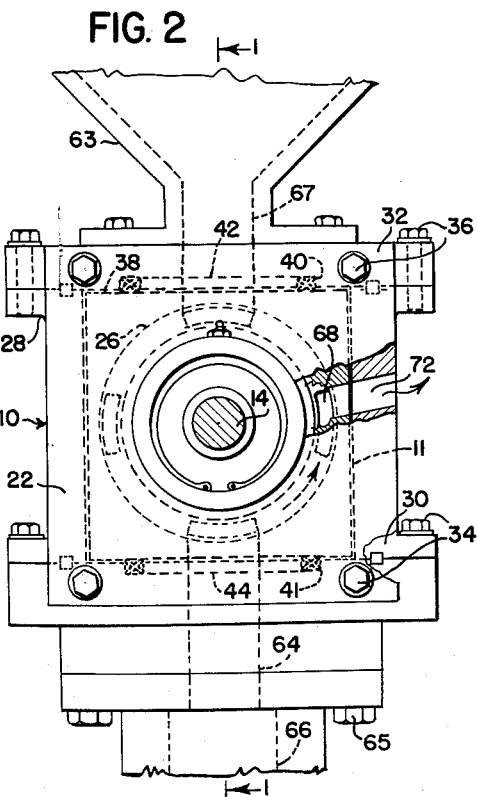
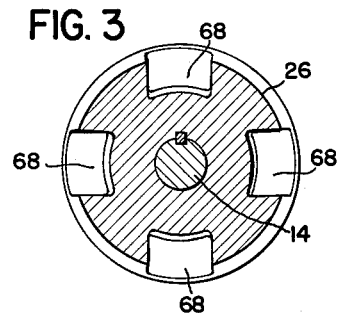
INVENTORS
GEORGE LONG
TAKUZO TSUCHIYA
ALLEN HUM
Stuart R. Peterson
ATTORNEY

United States Patent Office 3,101,853
Patented Aug. 27, 1963

3,101,853
ROTARY VALVE
George Long, Takuzo Tsuchiya, and Allen Hum, Minneapolis, Minn., assignors to General Mills, Inc., a corporation of Delaware
Filed Jan. 11, 1961, Ser. No. 82,069
10 Claims. (Cl. 214—17)

The present invention relates generally to rotary valves and more specifically to improve pressure-locked rotary feeding valves.

In industrial applications rotary valves are often employed for feeding material to a processing machine or other apparatus, and in some instances the material is discharged into or out of a pressurized chamber or container. In such cases it becomes necessary to prevent loss of pressure and/or material by maintaining a close sealing engagement between the relatively movable parts of the valve. For example, in machines for puffing wheat, rice, other grains, or cereal doughs made therefrom, steam is one medium employed as a cooking agent. Its use may present problems of pressure and temperature in both the operation of the valve and the handling of the material itself.

Rotary valves are known which include a valve housing, a valve plug or rotor member journaled for rotation in the housing with pockets on the rotor member for feeding material through the valve, and a replaceable wear-liner or valve seat member intermediate the valve rotor and the valve housing. In such valves the valve housing, rotor and seat members have heretofore been rather rigidly constrained in relation to each other. By having the valve elements rigidly constrained against movement it has therefore been necessary that the axis of rotation of the rotor extend accurately through the center of the rotor, valve seat, and valve housing, and that the valve surface of the rotor be as concentric about its actual axis of rotation as feasible. Thus, expensive precision machining of all of the valve elements has been required in cases where close tolerances are needed, especially where pressure-tight seals are to be maintained.

Even so, certain errors are unavoidable and may develop during manufacture of the valve. In addition to problems in the maintenance of close manufacturing tolerances, certain other problems may occur during the use of the valve. For example, when such valves are employed in the above-mentioned apparatus in which high temperatures occur, differential expansion characteristics of the valve seat material and the material of which the valve rotor is constructed may cause malfunctioning of the valve. Thus, leakage may develop and become progressively worse as the valve becomes worn. Due to thermal expansion of the components of the valve, the axis of the rotary valve surface of the rotor member may even be displaced eccentrically or at a slight angle to its actual axis of rotation. Thus, the valve liner surface which is in contact with the rotor valve surface is hard put to satisfy both the fixed constraint of the supporting housing and the changing constraint of the revolving rotor surface.

An object of the invention is to provide an improved rotary valve in which binding of the valve elements due to misalignment of the valve rotor is prevented. More specifically, an aim of the invention is to provide an improved rotary valve in which the valve seat or liner member of the valve and the valve rotor member are supported for limited relative displacement of one of such members.

Another object is such a rotary valve in which sealing means is provided to prevent pressure loss irrespective of the relative displacement of one of the rotor and valve seat members.

A further object of the invention is to provide an improved rotary valve provided with an improved thrust means for maintaining positive seating engagement between the wear liner and rotor of the valve.

Other objects and advantages will become apparent in the following specification and the appended drawings in which:

FIGURE 1 is a longitudinal sectional view of the improved valve, taken along the line 1—1 of FIG. 2;

FIG. 2 is a front elevational view, with certain parts shown in section, taken generally along line 2—2 of FIG. 1;

FIG. 3 is a detail sectional view of the valve rotor taken in the direction of line 3—3 of FIG. 1;

FIG. 4 is an enlarged sectional view of one of the sealing elements shown in actual use as in FIG. 1;

FIG. 5 is a partial sectional view taken in the direction of line 5—5 of FIG. 1; and FIG. 6 is a partial longitudinal sectional view like that of FIG. 1, but illustrating a further embodiment of the invention.

As seen in FIGS. 1 to 4, the improved valve includes a housing which is indicated generally by the numeral 10, in which is provided a cubicle chamber 11 for a conical valve rotor member 26. The rotor extends longitudinally through the chamber 11 and its shaft 14 is suitably journaled for rotation in bearings 16 and 18 which are supported in end plates 22 and 24 of the valve housing 10. A pair of thrust bearings 20 in end plate 24 limits axial movement of shaft 14 in one direction.

The valve housing 10 also includes side plates 28 and 30 and a top plate 32 which are held together by bolts 34 and 36 to form the previously mentioned chamber 11. For reasons described below, this chamber is preferably non-circular and is shown in this case as a rectangular or cubicle chamber.

The valve housing 10 is provided interior of its chamber 11 with a wear liner or valve seat member, which is indicated generally by the numeral 38. The wear liner or valve seat member 38 has an outer surface of substantially the same non-circular or rectangular shape as the interior of chamber 11. As seen in FIGS. 1 and 2, however, the outer surface of member 38 is somewhat smaller in size than chamber 11, to provide clearance between all sides of liner 38 and the interior of the chamber. According to the invention, this clearance constitutes part of the preferred means for providing limited relative movement of one of the seat and rotor members, in this case the seat member. The wear liner or valve seat 38 is composed of a suitable bearing material, one such material being Bearium B4 produced by Bearium Metal Corp., Rochester, New York. The liner 38 is maintained in a spaced relation away from the inner surfaces of the chamber 11 by a sealing means in the form of resilient or yieldable sealing rings 40 and 41 which are disposed in grooves 42 and 44 in the top plate 32 and in the base of the housing 10, respectively. The grooves 42 and 44 may form a circular, a rectangular or other path around the inlet and outlet openings of the valve in which the rings 40 and 41 are positioned to provide an adequate seal around the said openings.

The sealing rings 40 and 41 in the present instance are shown as quad-rings (see FIG. 4). However, other sealing means such as O rings or other devices can conceivably be employed.

The wear liner or valve seat member 38 and the thrust member 46 in the embodiment of FIG. 1 may be formed in two parts as shown, or constructed as an integral unit. The wear liner in the present instance is indicated by the numeral 38, and is engaged by or may be secured to a thrust member 46 which engages the inside surface of the forwardmost end plate 22 of the housing 10. The thrust plate member 46 has an annular engagement surface 47 (see FIG. 5) which surrounds the shaft 14 and which engages the interior of the end plate 22. A tapered surface 49 extends away from the engaging surface 47 and, as will be described later in the specification, allows limited rocking action of the valve rotor 26 and the valve seat or liner member 38.

The previously mentioned bearings 20 are supported in an adjusting nut or collar 48 which is threaded into the end of the end plate 24. The shaft 14 of the rotor 26 extends outwardly beyond the end of the bearings 20 and is provided around the end thereof with an annular collar 50 which is pinned or fastened to the shaft 14 by a taper or roll pin 52. An annular shoulder 54 is provided on the shaft 14 adjacent the bearings 20, and as the adjusting nut is threaded inwardly the shaft 14 is moved axially of the chamber 10 to position the rotor 26 in a conical bore or opening 56 in the liner 38. The liner is free of constraint within the chamber 11 and is moved forward by the rotor 26 until the annular surface 47 of thrust member 46 is in engagement with the interior of the forwardmost plate 22. The rotor 26 and the liner 38 are then properly seated in the interior 11 of the chamber 10. Lock nut 58 is then threaded onto the adjusting nut 48 to maintain the assembly in an adjusted position. Should it be necessary to adjust or remove the rotor 26 from the liner 38, the lock nut 58 is loosened, the adjusting nut or collar 48 is backed up and the roll pin 52 withdraws the shaft 14 and the rotor 26 axially of the liner 38. The above may be accomplished while the valve is in or out of operation.

The valve housing 10 includes an inlet 60 and an outlet 64 and in the present instance is positioned beneath a suitable feeder or hopper 63 which is secured to the valve 10 by bolts 65. The hopper 63 also has a discharge outlet 67 in communication with the inlet 60 of the valve 10. The valve 10 is likewise secured by bolts 65 to a flanged inlet 66 of a pressurized chamber (not shown). The inlet 60 in the valve chamber 11 also extends through the upper portion of the valve liner 38 and communicates with its conical surface 56 adjacent valve pockets 68 on the rotatable valve rotor 26. Material is received in the inlet 60 from the discharge outlet 67 of hopper 63 and passes into the path of the valve rotor 26.

As best seen in the sectional view of FIG. 3, the valve rotor is provided around its circumference with a plurality of the previously mentioned valve or receiving pockets 68 which are moved into and out of communication with the inlet and outlet ports 60 and 64 of the valve 10. A suitable pulley 70 is provided on the shaft 14 and is appropriately connected to an actuating means associated with the previously mentioned pressure chamber. The pulley 70 serves to rotate the shaft 14 and the rotor 26 to move the pockets 68 between the inlet and outlet ports 60 and 64 of the valve 10. Thus, material received in a valve pocket at the inlet port 60 is rotated with the valve rotor 26 and is discharged into the outlet port 64 and hence into the inlet port 66 connected to the pressure chamber.

Also provided in the housing 10 in communication with the liner 38 and rotor 26 is a pressure discharge port 72 (FIG. 2). The pressure discharge port 72 serves to release from the valve pockets 68 the relatively small amount of pressure that is picked up during the discharge of material. The latter pressure is released before the pockets are rotated to an inlet position to receive additional material. In this way the pressure picked up by a pocket 68 at the outlet does not interfere with the receipt of material entering the pockets at the inlet.

During the above operation it will be realized that the previously mentioned sealing rings 40 and 41 have provided continuous seals between the inlet and outlet ports 60 and 64 to prevent a loss of pressure from the pressure chamber.

While the above, except for features of the applicants' invention, is somewhat typical of a rotary valve in operation, it is possible that the central axis of the rotor shaft of the valve will not always be accurately positioned within the valve chamber. Displacement of the axis could occur during manufacture of the valve or when the valve is utilized in an apparatus in which high pressures and/or in which extreme temperature changes occur. In the latter instance, differential expansion characteristics of the valve components can in some instances cause malfunctioning of the valve. To be more specific, thermal expansion of the components could, as one example, create an eccentric condition in the valve rotor, thus creating a binding condition in the valve.

In the present instance, however, the above problems are substantially obviated by the sealing rings 40 and 41 which provide a spacing between the inner surfaces of the valve chamber 11 and the outside surfaces of the liner 38. Thus, displacement of the axis of the shaft 14 and the rotor 26 in a plane at right angles to the shaft 14 is taken up by the resiliency of the sealing rings 40 and 41. Likewise the tapered surface 47 of the thrust plate 46 allows the valve rotor 26 to cause movement of the liner 38 without binding, should such a requirement occur. Thus, while the rotor 26 is constrained within the liner 38, the resiliency of the sealing rings 40 and 41 allows the liner to move within the chamber 11 to avoid any constraint which might otherwise occur. Therefore, the applicants have provided a valve which has inherent means to compensate for limited radial displacement of the valve rotor and liner relative to the axis of the shaft 14.

While the above embodiment illustrates one feature of the invention, other embodiments are feasible, one of which is illustrated in FIG. 6. Due to the similarity between the embodiments, like parts have been given like numeral designations for purposes of simplicity.

In the valve housing 10 of FIG. 6 the valve rotor 26 and the liner 74 retain freedom of translational movement not only at right angles to the axis of the shaft 14 but also are free to move axially of the shaft 14. The latter is accomplished by a resilient thrust means in the form of a compression spring 76 between the valve liner 74 and the inside surface of the plate 22. Thus the resilient compression spring 76 supplies a biasing thrust along the axis of the shaft 14 which maintains the liner and the rotor in contact with the liner's inner surface 56, and the valve liner retains a certain degree of freedom of movement along the axis of the shaft 14.

Thus in the above embodiments we have presented a detailed description of our invention together with some of the ways the invention can be carried out.

Now therefore we claim:

1. A rotary pressure-lock valve comprising a valve housing provided with a valve chamber having an inlet and an outlet, a valve rotor provided with a tapered valve surface mounted for rotation about an axis within said chamber, and having at least one pocket thereon for receiving material from said inlet and discharging material to said outlet, a liner in said chamber intermediate said rotor and said chamber and having outside dimensions less than said chamber, said liner provided with a conical opening therein encircling and closely fitting the tapered surface of said rotor, and a yieldable sealing means surrounding each said inlet and said outlet between said liner and said chamber, said sealing means allowing limited radial displacement of said liner relative to the axis of rotation of said rotor to insure close seating engagement between the conical surface of said liner and the tapered surface of said valve and said sealing means also preventing pressure leakage at each of said inlet and said outlet during such displacement.

2. An improved rotary pressure-lock valve comprising a valve housing provided with a valve chamber having an inlet and an outlet, a valve rotor provided with a tapered valve surface mounted for rotation about an axis within said chamber and provided with at least one valve pocket for receiving material from said inlet and discharging material to said outlet, a liner in said chamber intermediate said rotor and said chamber, said liner having outside dimensions less than said chamber and provided with a conical valve seat surface, thrust means in said housing urging said conical surface into close seating engagement with the tapered surface of said rotor, said liner also having openings aligned with said inlet and outlet for passage of material to and from said pocket, and a resilient sealing means at each said inlet and said outlet between said liner and said chamber, said sealing means preventing pressure leakage through said valve between said inlet and said outlet and allowing limited radial displacement of said liner relative to the axis of rotation of said rotor to insure close seating engagement between the conical surface of said liner and the tapered surface of said valve.

3. An improved rotary pressure-lock valve comprising a valve housing provided with a bearing means and a rectangular valve chamber having an inlet and an outlet, a valve rotor provided with a shaft means extending centrally through said chamber and journaled for rotation in said bearing means, said rotor provided with a tapered valve surface and having at least one valve pocket movable between said inlet and said outlet in response to the rotation of said shaft, a rectangular liner in said chamber having outside dimensions of less extent than said chamber, said liner provided with a conical valve seat opening for closely fitting engagement with the tapered surface of said rotor, said liner having openings aligned with said chamber, an inlet and outlet for communicating with said conical surface and said rotor, a resilient means surrounding each said inlet and said outlet and providing a seal around said openings intermediate said liner and said chamber, said resilient means also allowing limited radial displacement of said liner relative to the axis of said shaft, and a spring means between said chamber and said liner urging the conical surface of said liner axially of said shaft into close seating engagement with the tapered surface of said rotor.

4. An improved rotary pressure-lock valve comprising a valve housing provided with an enclosed valve chamber having an inlet and an outlet, a valve rotor provided with a tapered valve surface rotatably mounted about an axis within said chamber and provided with a plurality of pockets for receiving material from said inlet and discharging material to said outlet, a liner in said chamber intermediate said rotor and said chamber, said liner having outside dimensions less than said chamber and provided with a conical valve seat surface therein encircling and closely fitting said tapered rotor surface, a thrust means in said housing urging said conical surface toward the tapered surface of said rotor, and a resilient sealing means surrounding each said inlet and said outlet between said liner and said chamber, said sealing means preventing pressure leakage from said valve between said inlet and said outlet and also allowing radial displacement of said liner relative to said axis to prevent binding and insure close seating engagement between the conical surface of said liner and the tapered surface of said valve.

5. The device of claim 4 wherein a bleed port is provided in said housing intermediate said inlet and said outlet and communicating with the pockets of said rotor during a portion of the movement of said pockets from said outlet to said inlet to release pressure from said valve.

6. The device of claim 4 wherein said thrust means includes a spring means in said chamber intermediate said liner and said chamber and positioned such as to urge said liner longitudinally of said axis to provide close seating engagement between the conical surface of said liner and the tapered surface of said valve.

7. The device of claim 4 wherein said thrust means includes a reaction plate between the interior of said chamber and said liner, and adjusting means for causing movement of said rotor longitudinally of said axis, said adjusting means cooperating with said reaction plate to provide close seating engagement between said tapered surface and the conical surface of said liner, and a locking means cooperating with said adjusting means for maintaining an adjusted position.

8. The device of claim 7 wherein said reaction plate engages the interior of said chamber in an annular area adjacent the axis of said rotor and wherein the surface of said reaction plate adjacent said area of engagement extends in a direction away from said chamber interior for limited rocking movement of said liner around a portion of said annular area of engagement.

9. A rotary valve assembly comprising a valve rotor member having an axis of rotation, a valve seat member encircling and closely fitting the rotor and within which said rotor member rotates and a first means resiliently supporting said seat member for limited translational and rocking relative movement in a plurality of directions thereby preventing binding during rotation of the rotor on its axis, and a second resilient means cooperating with said valve seat member for maintaining the rotor and seat members in close pressure-tight engagement with each other throughout said limited relative movement and rotation.

10. A rotary valve assembly comprising a valve support housing member, a valve rotor member having an axis of rotation, a valve seat member which extends completely circumferentially around said rotor and within which said rotor member rotates in pressure-tight engagement, and means supporting said rotor and seat members in said housing, said supporting means including means supporting the rotor member for rotation on said axis, means preventing rotation of said seat member around said axis, and first and second positioning means located between said housing and seat members and providing limited relative transverse and axial rocking movement of said seat member with respect to said housing, at least one of said positioning means being resilient and thereby resisting relative displacement of said seat member from its pressure-tight engagement with said rotor.

References Cited in the file of this patent

UNITED STATES PATENTS

| 2,428,241 | Pootjes | Sept. 30, 1947 |
| 2,628,060 | Parker | Feb. 10, 1953 |
| 2,816,693 | Greaves et al. | Dec. 17, 1957 |
| 2,960,245 | Knapp | Nov. 15, 1960 |